United States Patent
Park et al.

(10) Patent No.: US 6,712,507 B2
(45) Date of Patent: Mar. 30, 2004

(54) TEMPERATURE SENSOR DEVICE FOR USE IN A CLEAN ROOM

(75) Inventors: Jae Chan Park, Suwon-si (KR); Deck Gyu Park, Inchun-Gwangyeoksi (KR); Jong Han Kim, Yongin-si (KR); Byung Chan Lee, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/106,204

(22) Filed: Mar. 27, 2002

(65) Prior Publication Data

US 2002/0163954 A1 Nov. 7, 2002

(30) Foreign Application Priority Data

May 4, 2001 (KR) ........................... 2001-24397

(51) Int. Cl.[7] .............................. G01K 7/18; G01K 7/16; G01K 13/00
(52) U.S. Cl. ...................... 374/185; 374/135; 374/138; 338/28
(58) Field of Search .................... 374/185, 141, 374/148, 135, 138, 163, 208; 338/28, 25; 136/231

(56) References Cited

U.S. PATENT DOCUMENTS

| | | | | |
|---|---|---|---|---|
| 2,307,626 A | * | 1/1943 | Kelly | 374/185 |
| 2,798,893 A | * | 7/1957 | Winkler | 374/135 |
| 3,061,806 A | * | 10/1962 | Stephens | 374/185 |
| 3,153,769 A | * | 10/1964 | Moses | 374/185 |
| 4,060,377 A | * | 11/1977 | Hentz et al. | 374/185 |
| 4,449,574 A | * | 5/1984 | Yoshino et al. | 374/148 |
| 5,161,894 A | * | 11/1992 | Bourigault | 374/185 |
| 5,498,079 A | * | 3/1996 | Price | 374/208 |

FOREIGN PATENT DOCUMENTS

FR  2353842 A  *  2/1978  ............ G01K/7/18

OTHER PUBLICATIONS

Omega, "The Temperature Handbook," vol. 29, p. C–13, 1995 (no month).*
Rosemount Engineering Company, Minneapolis, MN, Bulletin 9612, Rev. A (Oct. 1962), pp. 1–7, 24–27.*

* cited by examiner

Primary Examiner—Christopher W. Fulton
Assistant Examiner—Stanley J. Pruchnic, Jr.
(74) Attorney, Agent, or Firm—Volentine Francos, PLLC

(57) ABSTRACT

A temperature sensor device for use in a clean room has a housing, a covering tube extending from the housing, a lead wire protecting tube extending from the housing within the covering tube, and a generally cylindrical temperature sensor also disposed within the covering tube. A fixing end of the temperature sensor is detachably coupled to a distal end of the lead wire protecting tube. A plurality of lead wires protrude from the fixing end and extend through the lead wire protecting tube and into the housing. The temperature sensor includes a temperature sensor element at a free end thereof. The covering tube has at least one hole by which the temperature sensor element is exposed to the atmosphere. Accordingly, the temperature sensor is highly responsive to changes in temperature, and can be repaired, maintained or replaced with ease.

16 Claims, 5 Drawing Sheets

TEMPERATURE SENSOR DEVICE FOR USE IN A CLEAN ROOM

BACKGROUND OF THE INVENTION

1. Field of the Invention

The present invention relates to a temperature sensor for detecting temperature. More particularly, the present invention relates to a temperature sensor device for detecting the temperature in a clean room.

2. Description of the Related Art

In manufacturing semiconductor devices, photolithography is used to form a fine pattern on a wafer. If dust or particles are attached to the wafer during the semiconductor manufacturing process, a failure may occur in the semiconductor device. Thus, dust and particles lower the yield of the manufacturing process and hence, add to the manufacturing cost of the semiconductor devices.

Therefore, a highly clean atmosphere has to be maintained for manufacturing semiconductor devices. Accordingly, semiconductor manufacturing lines are installed in a clean room.

In addition, because the semiconductor manufacturing process includes various manufacturing techniques that produce chemical reactions on a surface of the wafer, a change in temperature of the wafer affects the manufacturing process. For this reason, the temperature of the clean room is controlled such that the clean room always maintains a constant proper temperature.

Accordingly, a clean room temperature control device is provided to maintain the clean room at the proper temperature. The clean room temperature control device includes a temperature sensor device for detecting the temperature of the clean room.

Known temperature sensor devices include model TY7700B21 F manufactured by the YAMATAKE company of Japan, model SS-5030 manufactured by the KONICS company of Japan, and model Pt-100 manufactured by the MYUNGSUNG company of the Republic of Korea. However, these conventional temperature sensor devices are designed to detect the temperature in a specific liquid or poor environment and so, they are not suitable for precisely detecting the temperature of a clean room.

FIG. 1 shows a temperature sensor of a conventional temperature sensor device. As shown in FIG. 1, a temperature sensor element 10 is accommodated in a dual protecting tube that includes inner and outer protecting tubes 12 and 14. The dual protecting tube is designed to protect the temperature sensor element 10 from the external environment. The inner protecting tube 12 is filled with silicon sealant 16.

With this type of temperature sensor device, the temperature of the clean room can be detected only after a certain delay due to the provision of the dual protecting tube. That is, the temperature response of a clean room temperature control device incorporating the temperature sensor having the dual protecting tube is rather slow.

SUMMARY OF THE INVENTION

An object of the present invention is to overcome the above-described limitation of the prior art.

Therefore, one object of the present invention to provide a temperature sensor device that has a fast temperature response so as to be particularly well-suited for use in a clean room.

Still another object of the present invention is to provide a temperature sensor device that is easy to maintain and repair.

To achieve these objects, the temperature sensor device of the present invention has a temperature sensor whose sensor element is exposed to the atmosphere so that it is highly sensitive to changes in temperature change in the atmosphere.

The temperature sensor device of the present invention also has a housing, a covering tube extending from the housing, and a lead wire protecting tube disposed within the covering tube and extending from the housing. The temperature sensor is also disposed within the covering tube. A fixing end of the temperature sensor is detachably coupled to a distal end of the lead wire protecting tube. A plurality of lead wires of the temperature sensor extend into the housing through the lead wire protecting tube. The temperature sensor element is formed at a free end of the temperature sensor so as to be exposed to an atmosphere via at least one opening, in the covering tube, e.g. an opening at the distal end of the covering tube.

Preferably, the covering tube also has a plurality of perforations, i.e., radial holes, that allow the outside air to easily flow onto the temperature sensor element.

In order to facilitate the maintenance and repair of the temperature sensor device, the housing has an opening at a first portion thereof which is substantially opposite to the location at which the lead wire protecting tube is connected to the housing, and a lid is detachably coupled to the housing over the opening. The temperature sensor is also preferably threaded to the distal end of the lead wire protecting tube.

BRIEF DESCRIPTION OF THE DRAWINGS

The above objects and other advantages of the present invention will become more apparent by referring to the following detailed description of the preferred embodiment thereof made with reference to the attached drawings, of which.

DETAILED DESCRIPTION OF THE PREFERRED EMBODIMENTS

Hereinafter, the present invention will be described in detail with reference to accompanying drawings.

Figure 1:
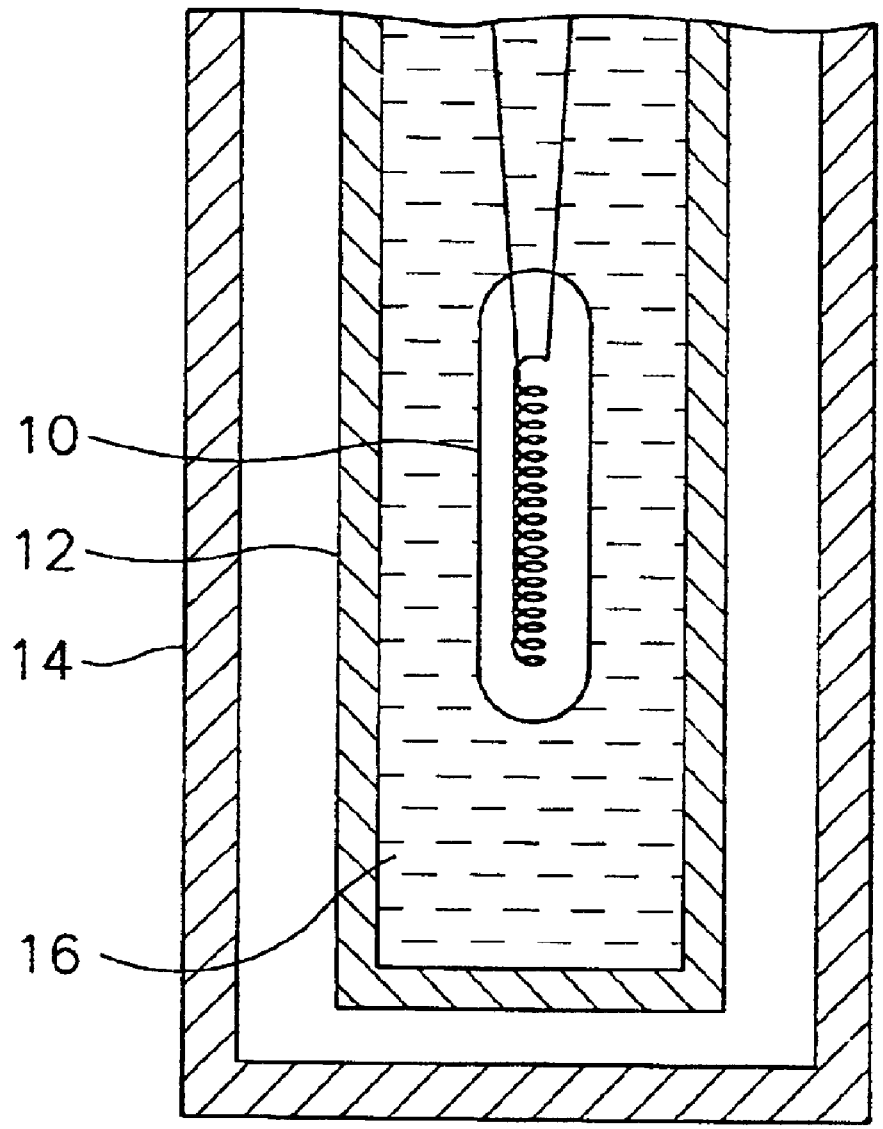
FIG. 1 is a sectional view of part of an essential part of a conventional temperature sensor device.
Figure 2:
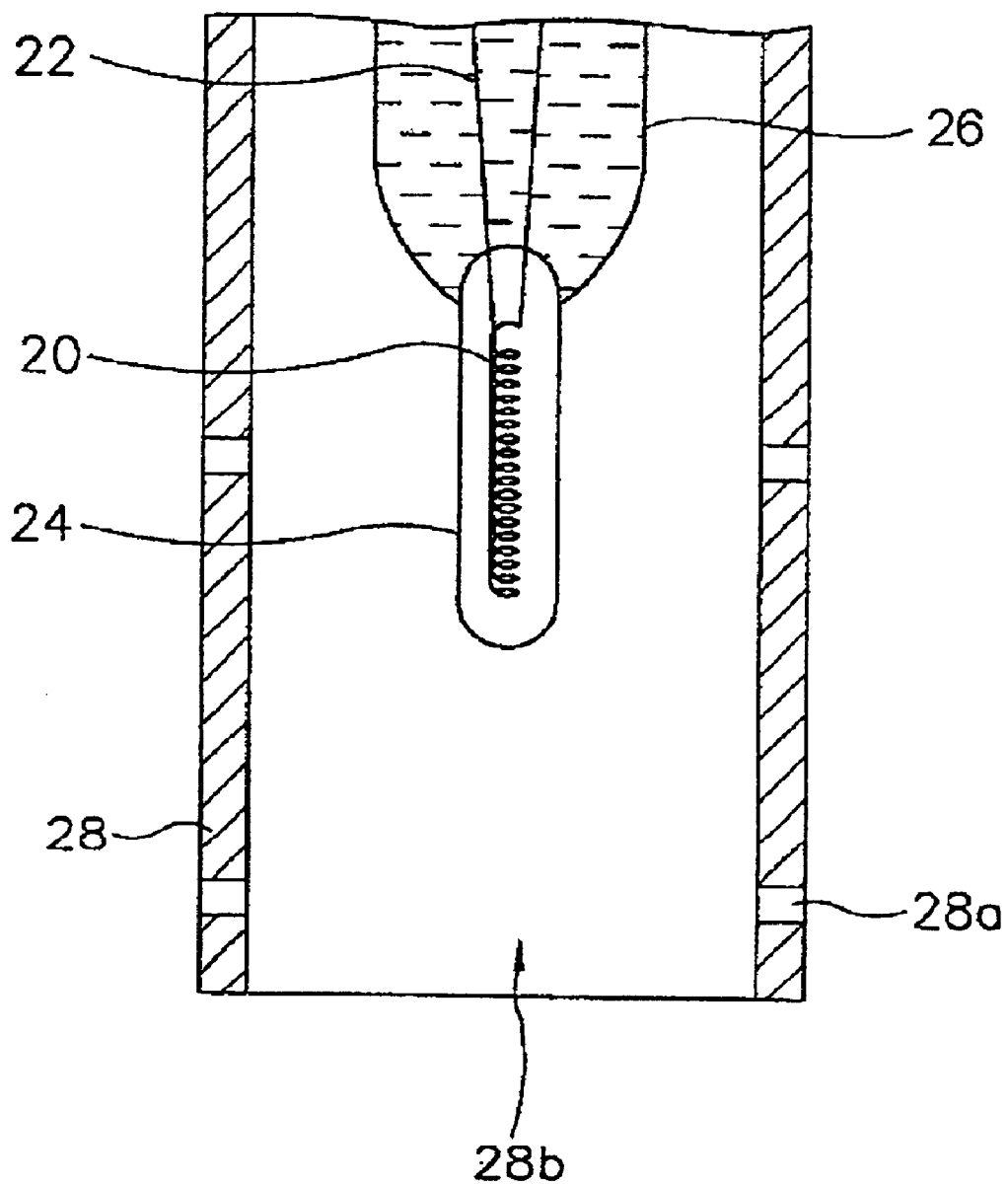
FIG. 2 is a sectional view of an essential part of a temperature sensor device for use in a clean room according to the present invention.

Referring to FIG. 2, a temperature sensor according to the present invention includes a temperature sensor element, an insulating capsule 26, and lead wires 22. The temperature sensor element comprises a platinum sensor coil 20 sealed and suspended within a glass cover 24. The lead wires 22 extend out of the glass cover 24 from the platinum sensor coil 20. The section of the glass cover 24 through which the lead wires 22 extend, as well as portions of the lead wires 22 passing from the glass cover 24 are sealed by the insulating capsule 26. The insulating capsule 26 is of silicon or a ceramic material.

Therefore, the temperature sensor element, as well as the temperature sensor itself, has a substantially cylindrical shape wherein the temperature sensor element is exposed at a lead (free) end of the temperature sensor.

The temperature sensor device also includes a covering tube 28 surrounding the insulating capsule 26 and temperature sensor element while being spaced therefrom by a predetermined distance so as to protect the insulating capsule 26 from an external impact. A plurality of holes 28a extend radially through the sidewall of the covering tube 28. In addition, the lower end of the covering tube 28 is open so as to define an opening 28b. The holes 28a and the opening 28b of the covering tube 28 allow the ambient air to easily flow to the temperature sensor element.

Therefore, only the glass cover 24 seals the sensor coil 20 of the present invention. Thus, the temperature sensor element is highly responsive to changes in the temperature of the ambient environment.

Figure 3:
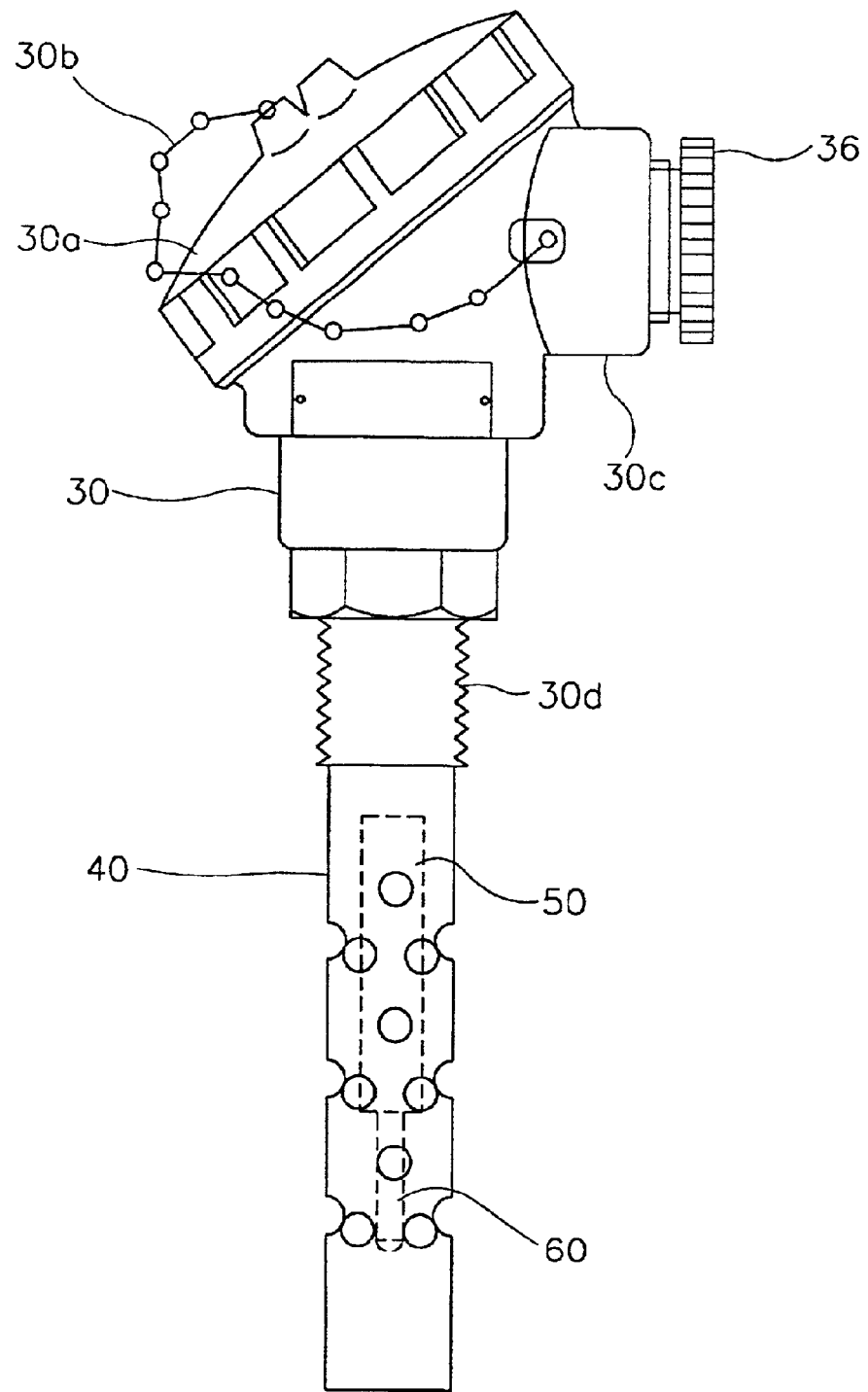
FIG. 3 is a side view of a clean room temperature sensor device according to the present invention.
Figure 4:
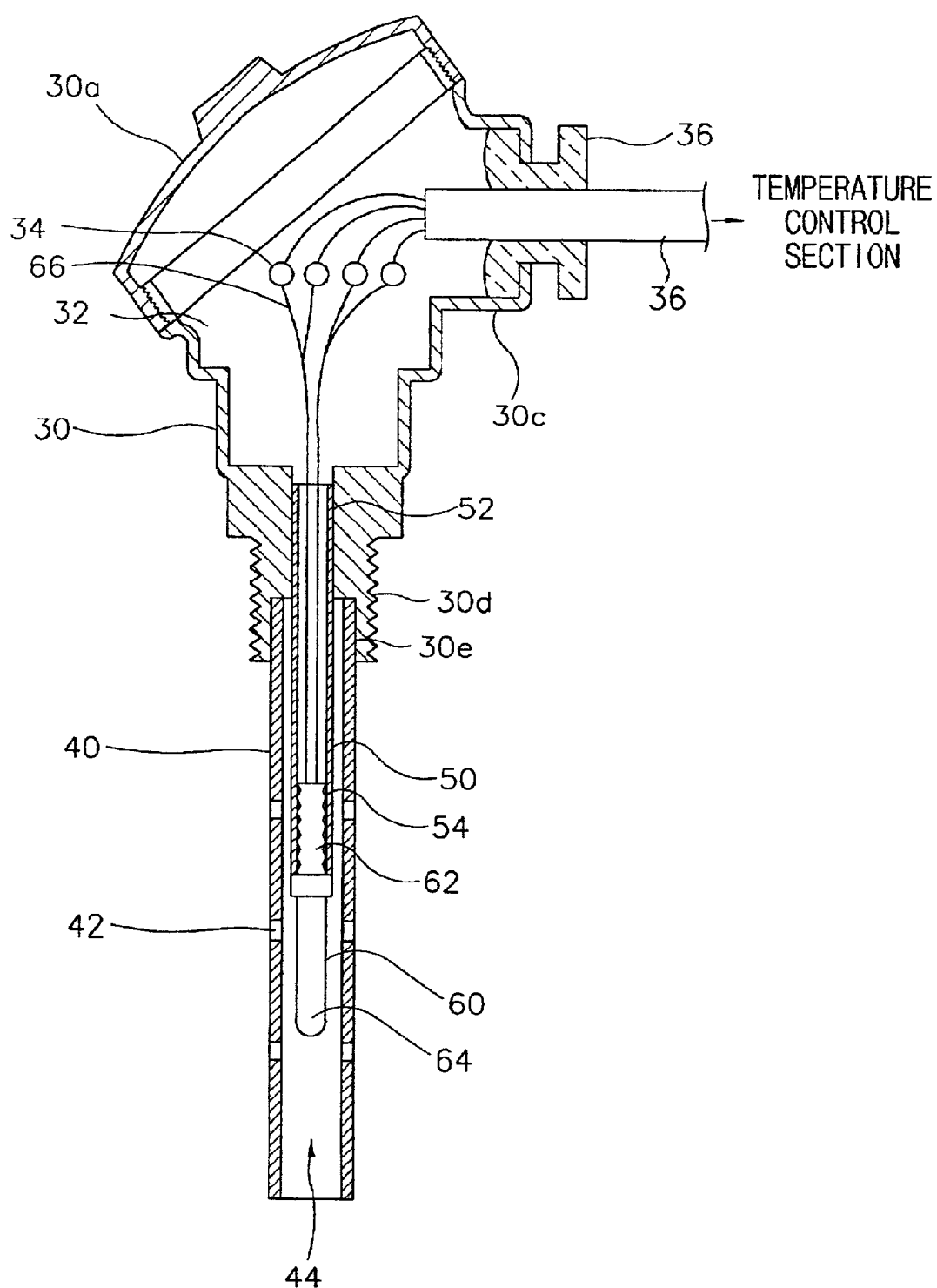
FIG. 4 is a longitudinal sectional view of the clean room temperature sensor device shown in FIG. 3.

FIG. 3 shows the external structure of a clean room temperature sensor device according to the present invention, and FIG. 4 shows the internal structure of the temperature sensor device.

Referring to FIGS. 3 and 4, the temperature sensor device of the present invention includes a housing 30, a covering tube 40, a lead wire protecting tube 50 and a temperature sensor 60.

The housing 30 has a central portion defining an internal cavity 32 that accommodates a terminal section comprising several terminals 34 of the device. The housing 30 is made of an aluminum alloy and has a substantially cylindrical shape. An inclined opening is formed at an upper portion of the housing 30 and a lid 30a, also made of an aluminum alloy, is threaded to the housing 30 across the inclined opening.

The lid 30a is also attached to the housing 30 by a chain 30b in order to prevent the lid 30a from being misplaced. The housing 30 also has a protrusion 30c extending laterally from the central portion of the housing 30 (from the right side in the figure). A cable grip 36 is coupled to an end portion of the protrusion 30c. The cable grip 36 is made of a ceramic material and fixes a longitudinal end of a cable 38 connected to a temperature control section (not shown) to the distal end of the protrusion 30c.

A coupling bolt 30d is integrally formed at a lower end of the housing 30 for fixing the temperature sensor device to a wall of the clean room via a bracket. A cavity 30e is defined in the coupling bolt 30d. The cavity 30e communicates with the internal cavity 32 of the housing 30.

The covering tube 40 is made of 304 SS (a stainless steel material). One end of the covering tube 40 extends into the cavity 30e of the coupling bolt 30d where it is press-fitted to the covering tube 40. A plurality of holes 42 extend radially through the sidewall of the covering tube 40. The holes 42 are disposed in an array, for example, a 6×3 array as viewed along the circumference of the covering tube 40. A hole 44 is also formed at the lower end of the covering tube 40 as defined by an end of the longitudinal opening in the tube. The holes 42 and the hole/opening 44 allow the ambient air to easily flow into the covering tube 40 and over the temperature sensor element.

The lead wire protecting tube 50 and the temperature sensor 60 are installed in the covering tube 40.

The lead wire protecting tube 50 is also made of 304 SS and has the shape of a pipe. One end of lead wire protecting tube 50 is coupled to the housing 30 by being press-fitted to the coupling bolt 30d within the cavity 30e. Screw threads are formed at an inner portion of the other end 54 of the lead wire protecting tube 50.

The temperature sensor 60 has a cylindrical shape. Screw threads are formed on the outer surface of a fixing end 62 of the temperature sensor 60 so that the temperature sensor 60 can be screwed into the end of the lead wire protecting tube 50. Lead wires 66 of the temperature sensor 60 protrude from the fixing end 62 of the temperature sensor 60. The lead wires 66 extend into the internal cavity 32 of the housing 30 through the lead wire protecting tube 50 and are electrically connected to the cable 38 at the terminal section 34. The lead wires 66 include four lead wires, two lead of which are signal lines and the remaining two are common lines.

A temperature sensor element 64, namely the platinum sensor and glass cover shown in FIG. 2, is located at the free end of the temperature sensor 60. The temperature sensor element comprises a super "A" level platinum sensor having a margin of error of about ±0.1° C. and a sensing temperature range of about 0 to 30° C.

According to the present invention, the temperature sensor element is not sealed or encapsulated within an external tube. That is, the covering tube of the present invention is an open structure so that the temperature sensor element disposed in the covering tube can be in direct contact with the ambient air. Accordingly, the temperature sensor is highly sensitive to changes in temperature of the ambient air.

Figure 5:
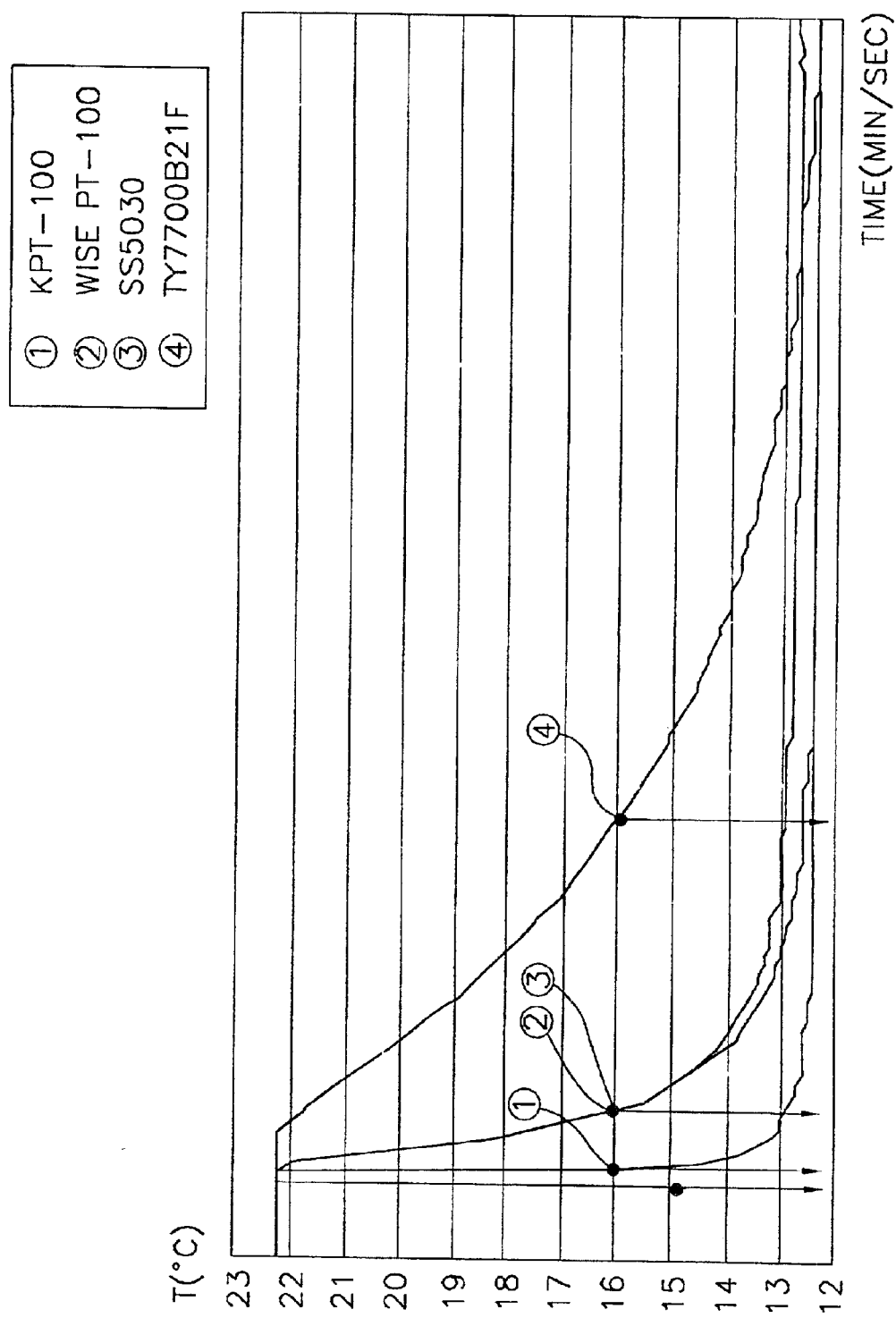
FIG. 5 is a graph showing the temperature response characteristics of a temperature sensor device of the present invention and conventional temperature sensor devices.

FIG. 5 is a graph showing the response characteristic of the temperature sensor device of the present invention and the conventional temperature sensor device. As shown in FIG. 5, the temperature sensor device [1] of the present invention took four seconds to reach a primary delay correcting temperature of 16° C. from 22.2° C. In contrast, the conventional WISE platinum sensor Pt-100 [2] and the conventional sensor SS5030 [3] each took 16 seconds, and the conventional sensor TY7700B21F [4] took 79 seconds.

That is, the response characteristic of the temperature sensor device of the present invention is about four to twenty times as responsive as the conventional temperature sensor devices.

As described above, according to the present invention, the temperature sensor element is not sealed by a dual or a triple sealing structure but is simply surrounded by an opened covering tube. Therefore, the temperature sensor device exhibits a temperature response characteristic of less than ten seconds, which is faster than those of the conventional sensor devices. Hence, the present invention can be used to better regulate the atmosphere in a clean room.

In addition, the temperature sensor can be easily replaced by removing the lid from the housing and detaching the temperature sensor from the protecting tube. Therefore, the maintenance and repair of the temperature sensor can be easily carried out.

Finally, although the present invention has been described in detail with respect to the preferred embodiments thereof, it should be understood to those skilled in the art that various changes, substitutions and alterations can be made thereto without departing from the true spirit and scope of the invention as defined by the appended claims.

What is claimed is:

1. A temperature sensor device comprising:
   a housing;
   a covering tube extending from an outer peripheral surface of the housing and having an open distal end opposite the housing;

a lead wire protecting tube disposed within the covering tube and connected to the housing, said lead wire protecting tube having an outer diameter smaller than an inner diameter of the covering tube and extending from the housing, and the lead wire protecting tube having a distal end opposite the housing;

a temperature sensor disposed within the covering tube, the temperature sensor having a fixing end detachably coupled to the distal end of the lead wire protecting tube and a free end opposite the distal end of the lead wire protecting tube, and the temperature sensor including a temperature sensor element constituting the free end of the temperature sensor, and a plurality of lead wires extending from the temperature sensor element through the fixing end of the temperature sensor and into the housing through the lead wire protecting tube, wherein the temperature sensor element has a cylindrical side surface and a terminal end surface spanning the cylindrical side surface at one end thereof, both the side surface and the terminal end surface of said temperature sensor element being exposed to the atmosphere through the open distal end of said covering tube.

2. The temperature sensor device as claimed in claim 1, wherein the covering tube has a plurality of holes extending radially therethrough.

3. The temperature sensor device as claimed in claim 1, wherein the housing has an opening therethrough at a location substantially opposite to that at which the lead wire protecting tube is connected to the housing, and further comprising a lid detachably coupled to the housing over said opening.

4. The temperature sensor device as claimed in claim 3, and further comprising a plurality of terminals disposed within said housing for use in connecting the lead wires of the temperature sensor to external connecting wires.

5. The temperature sensor device as claimed in claim 4, wherein the lead wires comprise four lead wires.

6. The temperature sensor device as claimed in claim 3, wherein the housing has an externally threaded portion to which the covering tube is attached.

7. The temperature sensor device as claimed in claim 1, wherein the temperature sensor is threaded to the distal end of the lead wire protecting tube.

8. The temperature sensor device as claimed in claim 1, wherein the temperature sensor element comprises a platinum sensor.

9. The temperature sensor device as claimed in claim 1, wherein the covering tube and the lead wire protecting tube are of stainless steel.

10. A temperature sensor device comprising:

a covering tube having at least one opening; and a temperature sensor disposed within the covering tube and spaced radially inwardly therefrom, the temperature sensor having a free end, and the temperature sensor including a temperature sensor element that constitutes said free end thereof, a plurality of lead wires extending from the temperature sensor element, and a capsule of heat insulating material from which the temperature sensor element extends and through which the lead wires extend upon passing from the temperature sensor element, and wherein the temperature sensor element has a cylindrical side surface and a terminal end surface spanning the cylindrical side surface at one end thereof, both the side surface and the terminal end surface of said temperature sensor element being exposed to the atmosphere through said at least one opening in the covering tube.

11. The temperature sensor device as claimed in claim 10, wherein said cylindrical temperature sensor element consists of a platinum sensor coil and a glass cover in which said sensor coil is enclosed and suspended.

12. The temperature sensor device as claimed in claim 11, wherein said lead wires extend from said sensor coil, and said capsule encompasses a portion of the glass cover within which the lead wires extend.

13. The temperature sensor device as claimed in claim 12, wherein said insulating material is selected from the group consisting of silicon and ceramics.

14. The temperature sensor device as claimed in claim 10, wherein said insulating material is selected from the group consisting of silicon and ceramics.

15. The temperature sensor device as claimed in claim 10, wherein said covering tube has a plurality of said openings extending radially therethrough.

16. A temperature sensor device comprising:

a covering tube having at least one opening; and a temperature sensor disposed within the covering tube and spaced radially inwardly therefrom, the temperature sensor including a temperature sensor element exposed to the atmosphere through said at least one opening in the covering tube and comprising a sensor coil and a glass cover in which said sensor coil is enclosed, a plurality of lead wires extending from said sensor coil, and a capsule of heat insulating material from which the temperature sensor element extends and through which the lead wires extend upon passing from the temperature sensor element, said capsule encompassing a portion of the glass cover within which the lead wires extend.

\* \* \* \* \*